Oct. 8, 1940.                J. P. JOHNSON                2,217,056
                              RELIEF VALVE
                          Filed Jan. 11, 1939
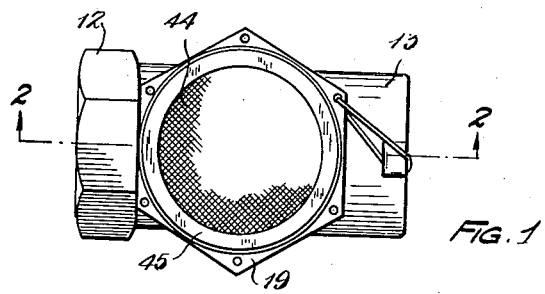
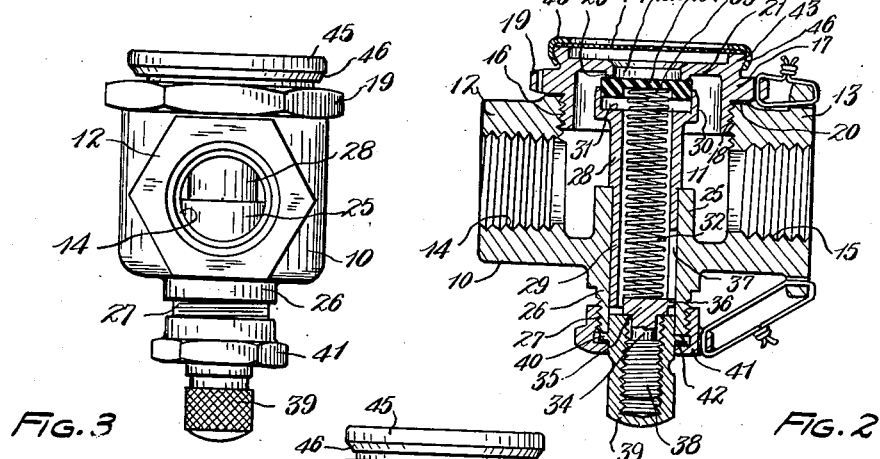
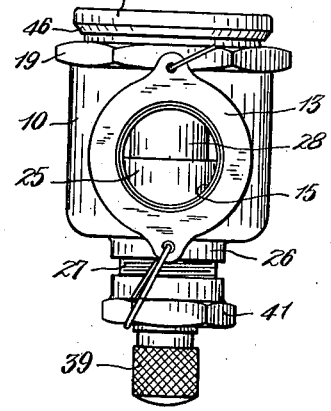

Patented Oct. 8, 1940

2,217,056

UNITED STATES PATENT OFFICE 2,217,056

RELIEF VALVE

James P. Johnson, Shaker Heights, Ohio, assignor, by mesne assignments, to Pump Engineering Service Corporation, Cleveland, Ohio, a corporation of Ohio Application January 11, 1939, Serial No. 250,432

1 Claim. (Cl. 251—145)

This invention relates to relief valves and more particularly to one designed for use on aircraft and disposed in the suction line between the various instruments and the vacuum pump for effecting substantially constant suction while the valve is in open position regardless of varying pump speeds.

Another object of the present invention is to provide a relief valve of the type referred to which is pre-loaded and adjustable to vary the pre-loading.

Another object of the present invention is to provide a relief valve in a light weight housing, of compact and simple construction yet efficient in operation.

With the objects above indicated and other objects hereinafter explained in view, my invention consists in the construction and combination of elements hereinafter described and claimed.

Referring to the drawing,

Figure 1 is a top plan view of a relief valve embodying the present invention.

Figure 2 is a vertical sectional view taken on line 2—2 in Figure 1 and showing details of the valve operating mechanism.

Figure 3 is an end elevational view of the relief valve looking toward the left hand side of Figure 2.

Figure 4 is an end elevational view similar to Figure 3 but looking toward the right hand side of Figure 2.

In the drawing I have illustrated a relief valve assembly of preferred construction adapted to be disposed within the suction line between a vacuum pump and instrumentalities actuated thereby, whereby the suction required to properly actuate the instrumentalities is maintained substantially constant while the valve is open regardless of the operating speed of the vacuum pump. It is well known that suction actuated instrumentalities employed on aircraft are delicate precision instruments and if subjected to abuse damage is caused thereto with resulting inaccuracies in their readings. It is desirable that the suction actuated instrumentalities be subjected to minimum suction but at constant pressure.

The relief valve disclosed in the drawing, therefore, embodies features which will produce these desired results and comprises a housing 10, preferably of aluminum and of relatively small size. The housing is provided with a chamber 11 and extensions 12 and 13 projecting outwardly on diametrically opposite sides and provided with interiorly screwthreaded openings 14 and 15 respectively which communicate with the chamber 11 and are adapted for connection respectively with the suction actuated instruments and a vacuum pump or other suction creating means. The housing 10 is further provided with an interiorly screwthreaded opening 16 extending transversely through its wall and communicating at its inner end with the bore 11. A plug 17 of hollow construction has a screwthreaded end 18 removably mounted in the screwthreaded opening 16 and has an hexagonal flange 19 projecting laterally outwardly therefrom for engagement with the adjacent face of the housing. A gasket 20 is disposed between the adjacent faces to provide a seal. The member 17 has an end wall 21 provided with an axially disposed opening 22 formed with a surrounding valve seat 23 projecting inwardly thereof. The opening 22 affords communication between the chamber 11 and the outside atmosphere and is for a purpose to be later described.

A relatively flat light weight disc valve member 24 is disposed upon the inside of the member 17 and engageable with the valve seat 23 for controlling the flow of air thereby. The housing 10, diametrically opposite to the opening 16, is provided with an inwardly extending tubular projection 25, the outer face of which terminates substantially midway of the chamber 11, while a similar tubular extension 26 projects outwardly in coaxial relation and is exteriorly screwthreaded at 27. A tubular sleeve 28 is disposed within the housing coaxially of the extension 25 and has a portion of reduced diameter 29 tightly fitting within the tubular members 25 and 26, the lower end terminating slightly short of the outer end of the extension 27 as more clearly shown in Figure 2. The inner end of the tubular member 28 is provided with an outwardly projecting annular flange 30 within which the disc valve member 24 is slidably disposed and its outward movement limited by abutment with the adjacent face 31. A coiled spring 32 is disposed within the tubular member 28 and has its inner end seated within a recess 33 provided in the adjacent face of the valve member. A spring tensioning member 34 has a portion 35 which is slidably disposed within the outer end of the tubular member 28 and engages the outer end of the spring 32. The portion 35 is provided with a tongue 36 which is free to slide within a slot 37 provided in the portion 29 of the tubular member 28. This slot and tongue connection is so formed as to permit substantially unrestricted slidable movement of the portion 35 within the tubular extension so as to effect any desired spring tension but prevents relative independent rotation about the axis of the spring. The spring tensioning member 34 has an externally screwthreaded outer end 38 projecting outwardly beyond the end of the extension 26 and a thumb adjusting member 39 having an interiorly screwthreaded bore adjustably mounted upon the portion 38. The member 39 has a lateral flange 40 which is adapted to seat upon the outer end of the extension 26 and a locking nut 41 screwthreadedly mounted upon the screwthreaded end 27 of the extension 26 and having an end wall provided with an opening through which the thumb adjusting member 39 freely projects. A gasket 42 is disposed between the outer face of the flange 40 and the inner face of the end wall of the nut 41 to provide a seal. When it is desired to adjust the tension of the spring, the nut 41 is slightly unscrewed which permits the member 39 to be rotated in clockwise or counter-clockwise direction depending upon whether it is desired to increase or decrease the tension of the spring. When this adjustment has been made the nut may again be screwed into place to prevent accidental displacement.

The plug 17 has an annular flange 43 projecting outwardly therefrom upon which a fine mesh screen 44 is disposed extending across the opening 22 in spaced relation thereto to prevent the admission of foreign matter other than air which might otherwise damage the elements. A retaining ring 45 is disposed upon the screen and has its marginal portion 46 bent tightly into engagement with the adjacent wall of the flange so as to prevent accidental disengagement of the screen.

In the operation of the device the inlet opening 14 is connected to the suction actuated instrumentalities while the outlet opening 15 is connected with the well known type of vacuum pump or other means for creating a vacuum for operating the instruments. If the vacuum pump operated at a constant speed there would not be any necessity for a relief valve but the speed of the vacuum pump varies with the speed of the engine to which it is drivingly connected. By knowing the maximum suction required for operating the various instrumentalities without injury, the tension of the coiled spring 32 may be adjusted to counteract the combined forces acting upon the valve member. So long as the vacuum pump operates at a speed which will create less than the maximum suction, the relief valve does not function but as soon as the speed of the pump increases it necessarily increases the suction to the instruments thus bringing the relief valve into operation. As the pump suction increases, the pressure in the chamber 11 decreases thus unbalancing the valve member and effecting its opening or unseating due to the presence of atmospheric pressure on its outer side. This unseating of the valve member permits outside air to flow thereby into the chamber 11 in such quantity as to offset the effect of the increased pump suction upon the instruments and thereby maintain that suction constant regardless of pump speeds.

While I have described the preferred embodiment of the invention it is to be understood that I am not to be limited thereto inasmuch as changes and modifications may be resorted to without departing from the spirit of the invention as defined in the appended claim.

What is claimed is:

In a suction relief valve providing a wide range of predetermined maximum suctions including a housing defining a chamber therein, threaded openings formed in the wall of said housing adapted for connection to a suction operated instrumentality and a suction pump respectively, a pair of coaxially related orifices formed in opposite wall portions of said housing in communication with said chamber, a tubular member mounted in a first one of said orifices, extending transversely of said chamber and into coaxial relation with said second one of said orifices, said tubular member being enlarged at the outer portion thereof to define a valve receiving guide, a disc-like valve mounted within said enlarged outer portion of said tubular member, a peripherally threaded closure member received in said second one of said transverse coaxial orifices, said member being formed with a coaxial valve seat for receiving said valve on one side thereof and being in communication with the atmosphere on the other side thereof, a long sensitive helical spring received within said tubular member with one end in contact with said valve for urging the same into engagement with said valve seat, adjustable means contacting the other end of said spring for adjusting the compression thereof, said means including a threaded member having a head portion with a radially extending protuberance thereon, said tubular member being formed with a coaxially extending slot receiving and guiding said protuberance and a rotatable coaxially fixed interiorly threaded bonnet-like member receiving said threaded member for adjusting the same to vary the position of said head and protuberance with respect to said guide and to thereby adjust the compression of said spring to render said valve sensitive to operate in response to a wide range of suctions to admit atmospheric pressure when the vacuum within said chamber rises above the predetermined value for which said adjusting means is set.

JAMES P. JOHNSON.